United States Patent
Onishi

[19]

[11] Patent Number: 6,150,744
[45] Date of Patent: Nov. 21, 2000

[54] SEALED TYPE MOTOR ARRANGEMENT

[75] Inventor: Yosuke Onishi, Hong Kong, The Hong Kong Special Administrative Region of the People's Republic of China

[73] Assignee: Brite Star Limited, Hong Kong, China

[21] Appl. No.: 09/458,325

[22] Filed: Dec. 10, 1999

[30] Foreign Application Priority Data

Aug. 13, 1999 [CN] China .................................. 99 2 19208

[51] Int. Cl.[7] .............................. H02K 5/00; H02K 5/22
[52] U.S. Cl. ...................... 310/89; 310/40 MM; 310/71; 310/67 R; 315/185 S; 40/429
[58] Field of Search ................................ 310/89, 40 MM, 310/71, 75 R, 67 R, 85; 362/286, 391, 806, 386; 315/185 S; 40/423, 435, 429, 430, 436, 437, 431, 432, 433, 434, 438, 470

[56] References Cited

U.S. PATENT DOCUMENTS

| | | | |
|---|---|---|---|
| 2,485,460 | 10/1949 | Rocco | 248/45 |
| 4,626,178 | 12/1986 | Terumoto | 310/89 |
| 4,705,484 | 11/1987 | Lerner et al. | 439/502 |
| 4,709,124 | 11/1987 | Wheeler et al. | 310/71 |
| 5,108,307 | 4/1992 | Cohen | 439/502 |
| 5,140,207 | 8/1992 | Baumeister | 310/83 |
| 5,334,897 | 8/1994 | Ineson et al. | 310/89 |
| 5,616,975 | 4/1997 | May et al. | 310/89 |
| 5,618,103 | 4/1997 | Fussell | 362/386 |
| 5,839,320 | 11/1998 | Komachi | 74/425 |

Primary Examiner—Burton S. Mullins
Attorney, Agent, or Firm—Ohlandt, Greeley, Ruggiero & Perle, L.L.P.

[57] ABSTRACT

A sealed type motor arrangement, comprising: a micro-motor with a reduction unit and a sealed housing made of plastic, said sealed housing having a bottom housing and a cover housing, said sealed housing defines a sealed space for accommodating said micro-motor and a non-sealed space, in the periphery of said sealed space of said bottom housing, said non-sealed space having a small groove with a resilient sealing plastic washer arranged therein, said bottom housing having an opening for a cylindrical shaft of said micro-motor to extend out of said sealed housing, a plurality of small apertures are arranged symmetrically between said bottom housing and said cover housing for tightening a plurality of screws to make said bottom housing and said covered housing sealed, a wire with a power supply input plug goes through an opening on a side wall of said bottom housing and a hole on a wall between said sealed space and said non-sealed space to connect a pair of leads of said motor in said sealed space, the hole on said wall through which the wire goes is sealed by a sealing clamping-sheet in the space defined by a projection part arranged in the non-sealed space of said bottom housing.

3 Claims, 5 Drawing Sheets

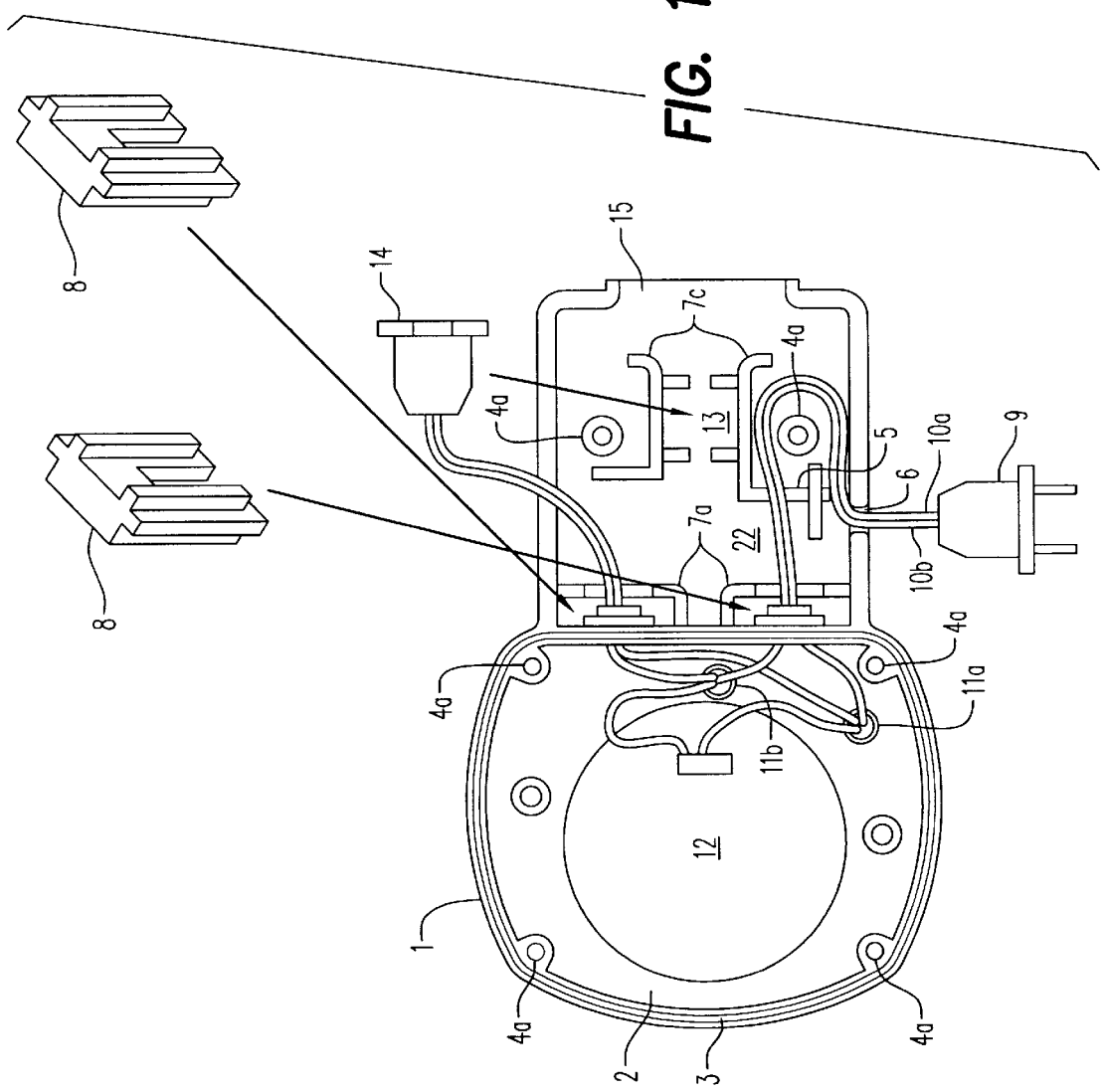

SEALED TYPE MOTOR ARRANGEMENT

BACKGROUND OF THE INVENTION

1. Field of the Invention

The present invention relates to a sealed type motor arrangement that not only can be used indoors, but can also be used outdoors, it comprises a specially-designed housing, a suitably-sized motor and a connected wire.

2. Description of the Prior Art

Because of poor sealing properties of the motor arrangement of the prior art for outdoor use of Christmas light decoration or other non-Christmas light decoration, etc., it cannot stand exposure to the sun and rain and a big temperature difference so that its service life is very short. On the other hand, in order to improve sealing, the similar product of the prior art is larger in volume and the manufacturing cost is higher.

SUMMARY OF THE INVENTION

One object of the present invention is to provide a motor suitable for all-whether environment. Because of the special design of the housing, it can absolutely protect the built-in motor and wire from the sun and rain. Though there is a temperature difference of 20 C or more, the motor arrangement can still operate normally.

Another object of the present invention is to provide a motor arrangement that is small and cheap. Besides, in this invention, ther e is merely one power-supply input which can provide two different power-supply outputs so that two electric effects are formed.

According to this invention, a sealed type motor arrangement is characterized in that it comprises a micro-motor with a reduction unit and a sealed housing made of plastics.

Said sealed housing comprises a bottom housing and a cover housing, said sealed housing defines a sealed space for accommodating said micro-motor and a non-sealed space, in the periphery of said sealed space of said bottom housing, there is a small groove with a resilient sealing plastic washer arranged therein, an opening is arranged on said bottom housing for a cylindrical shaft of said micro-motor to extend out of said sealed housing, a plurality of small apertures are arranged symmetrically between said bottom housing and said cover housing for tightening the screws to make said bottom housing and said cover housing sealed, a wire with a power-supply input plug goes through an opening on the side wall of said bottom housing and a hole on the wall between said two spaces to connect with leads of said motor in said sealed space, the hole on said wall through which the wire goes is sealed by a sealing clamping-sheet in the space defined by a projection part arranged in the non-sealed space of said bottom housing.

The sealing properties of the sealed type motor arrangement of the present invention are excellent, its volume is small and manufacturing cost is low, besides, it is arranged with an electric socket which can output electric energy to other electrical appliances.

The present invention can be used for a movable and illuminating Christmas light decoration device.

BRIEF DESCRIPTION OF THE DRAWINGS

Now with reference to the accompanying drawings, the present invention is described through the preferred embodiment.

The drawings are briefly stated as below:

FIG. 1 shows a combination view of the present invention, in which the arrangement of the bottom housing with the motor, the wires, and the outputs and inputs of the power-supply is shown;

DETAILED DESCRIPTION OF THE INVENTION

Figure 2C:
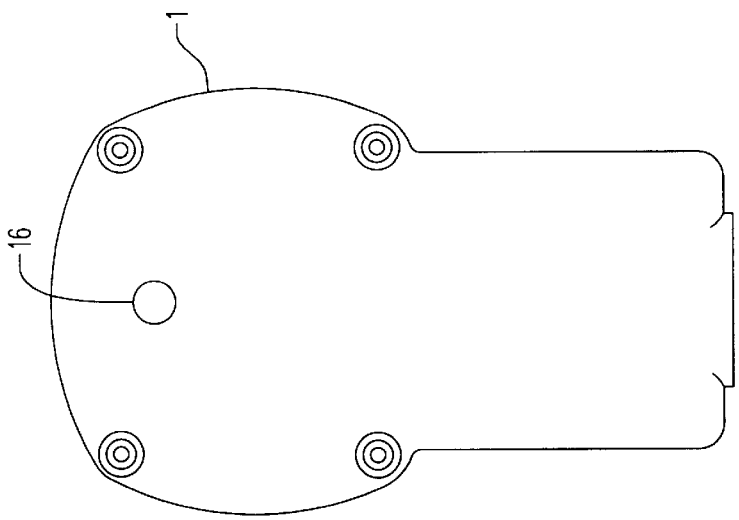
FIGS. 2A–2F show the special shape and design of the bottom housing.

As shown in FIG. 1, a bottom housing 1 is arranged with a space 2 for accommodating a motor 12, wire connection points 11a and 11b are arranged in the space 2. In the periphery of the space 2, there is a small groove 3, in which a small resilient plastic ring can be placed to form the sealed space 2 when a cover housing 17 is placed on the motor arrangement. The sealed space 2 protects the motor 12 and the wire connection points 11a and 11b from the influence of outdoor factors, including penetration of rain and fog, or intrusion of dust and insects. Otherwise, if the moisture content penetrates into the wire connection points, it will cause the unsafe phenomenon of electricity-leaking or short-circuit. As shown in the Figure, the power-supply of the connection point 11a is from a wire 10a, and the power-supply of the wire 10a is from a power-supply input plug 9. Through the connection point 11a, the wire 10a connects the input power-supply to one lead of the motor 12 and one wire of a power-supply output socket 14. Simultaneously, through the connection point 11b, another wire 10b connected to the input plug 9 respectively connects with another wire of the motor 12 and another connection wire of the power-supply output socket 14.

When the power-supply input plug 9 is connected to the power supply, the motor 12 starts to operate. The cylindrical shaft connected to the motor 12 (not shown in the Figure) extends to the part outside an opening 16 of the bottom housing 1 and drives the accessories connected with it operate. Besides, if the power-supply output socket 14 is also connected with the other electrical appliances, such as a light decoration device, then it can cause the light decoration illuminate or the other electrical accessories to work accordingly.

Besides including the sealed space 2, the bottom housing 1 shown in FIG. 1 includes a non-sealed space 22 at another end. The space 22 has an obvious opening 15, it can provide the other electrical means with a location to connect with the power-supply output socket 14 . The projection 7a of the space 22 shown in FIG. 1 can provide separation for arranging the wires 10a and 10b connected to the power-supply input plug 9 and the wire connected to the power-supply output socket 14 in different positions of the same space. As shown in the Figure, the wires 10a and 10b can extend from an opening 6. Relatively, the power-supply output socket 14 can be placed in a space 13 defined by a projection 7c to fix its position so that jacks of the socket face to the opening 15. The sealing clamping-sheets 8 shown in FIG. 1 can be put into the spaces defined by the projections 7a to be adjacent to the projections 7a so as to fix the position of the associated wires and seal the gap of the spaces 2 into which the wire enter.

Figure 2F:
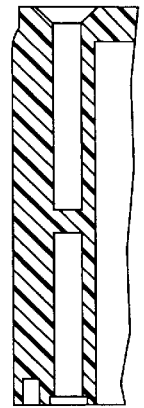
Figure 2B:
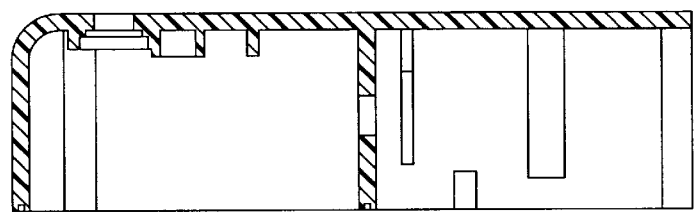
Figure 2E:
Figure 2A:
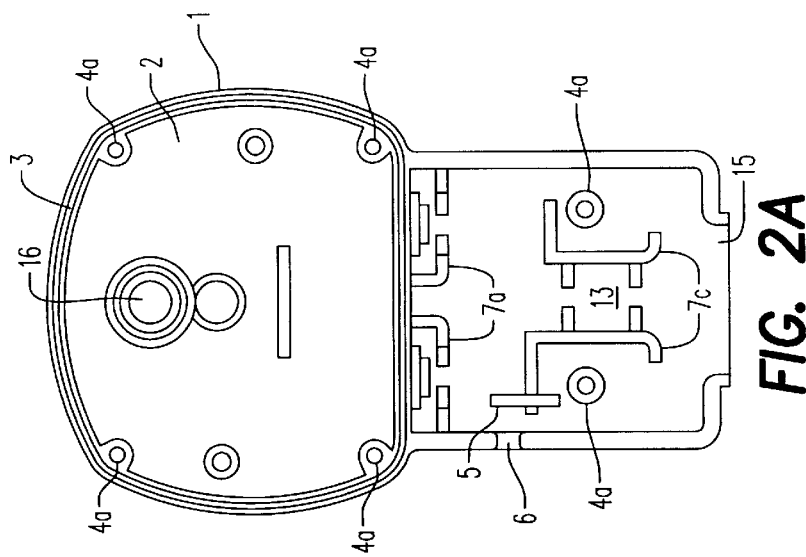
Figure 2D:
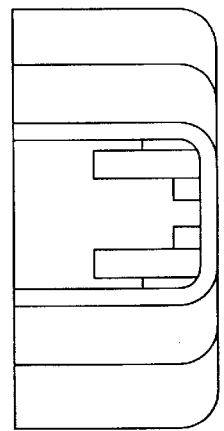

What is shown in FIGS. 2A–2F is merely the bottom housing 1. The motor, wires, sealing clamping-sheet 8 and the other parts are not shown in FIGS. 2A–2F. FIGS. 2A–2F show that the opening 16 allows the cylindrical shaft connected with the motor 12 to extend to outside the housing. Besides, FIGS. 2A–2F show a projection 5 more clearly so that it is convenient to fix the wires 10a and 10b to the position of the opening 6.

Figure 3D:
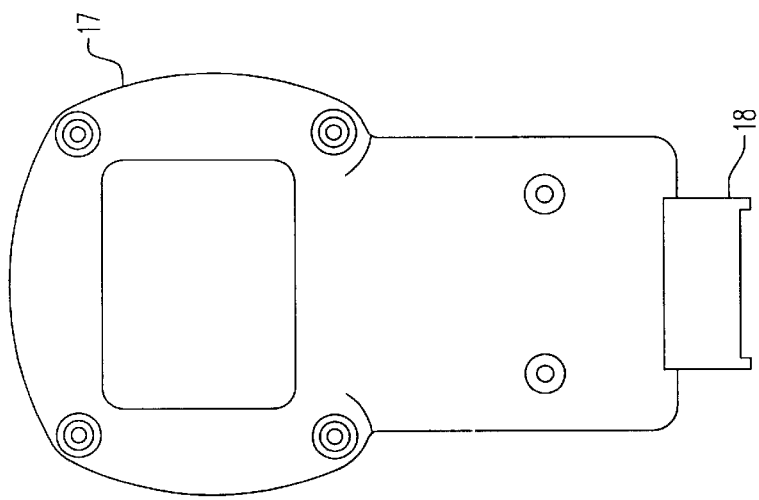
FIGS. 3A–3F show the special shape and design of another half of the cover housing.
Figure 3C:
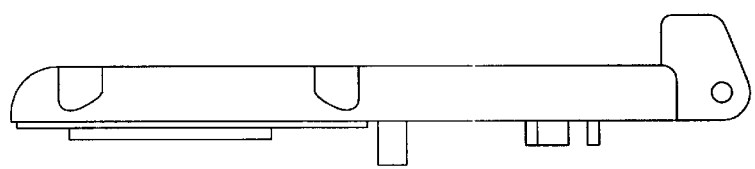
Figure 3F:
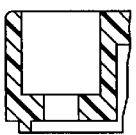
Figure 3B:
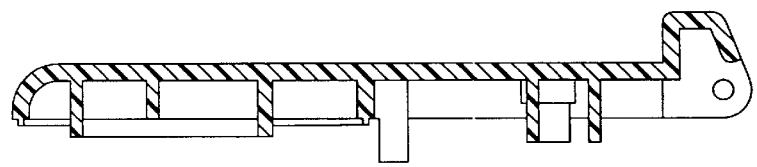
Figure 3A:
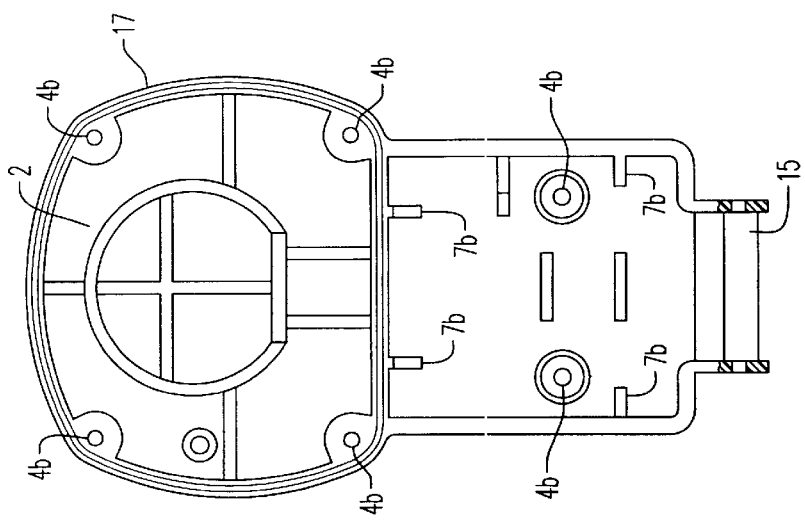
Figure 3E:
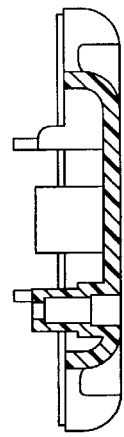

FIGS. 3A–3F are views showing the cover housing 17 in respective directions. The built-in corresponding parts 4b and 7b contact with the corresponding parts 4a, 7a and 7c of the bottom housing 1 so that the cover housing 17 and the bottom housing 1 are connected to become one housing. A small aperture can be pre-arranged in the parts 4a and 4b for a screw to be arranged so as to make the housing connected more tightly.

The cover housing 17 shown in FIGS. 3A–3E is arranged with a protrusion 18, on which a valve 19 can be arranged.

Figure 4C:
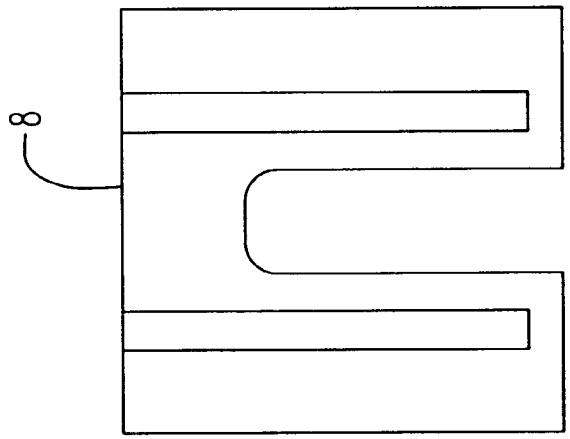
FIGS. 4A–4D show the special shape and design of a sealing clamping-sheet shown in FIG. 1.
Figure 4B:
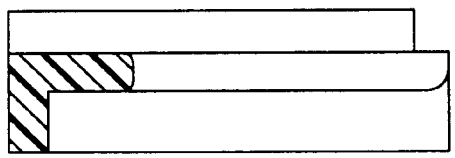
Figure 4A:
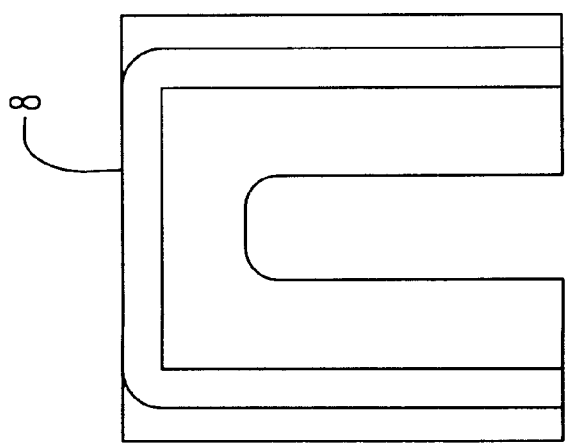
Figure 4D:
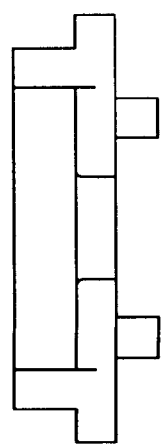

FIGS. 4A–4D are the shape and design of the sealing clamping-sheet 8.

Figure 5A:
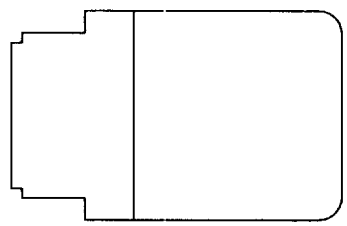
FIGS. 5A–5G show a valve means for covering the output terminal of the power-supply.
Figure 5B:
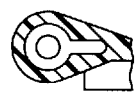
Figure 5C:
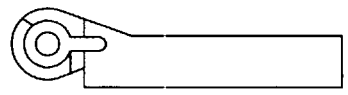
Figure 5D:
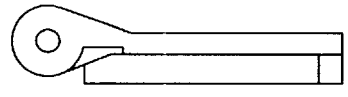
Figure 5E:
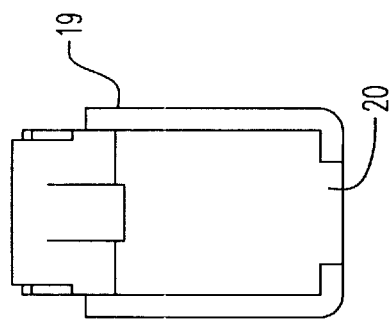
Figure 5F:
Figure 5G:
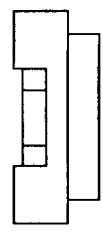

FIGS. 5A–5G show the shape and design of a valve 19. The valve 19 can be arranged on the protrusion 18 of the cover housing 17 by means of a screw and a spring. The valve 19 covers the opening 15 with the aid of the elastic force of the spring. A concavity 20 of the valve 19 provides a virtual place so that it is convenient to open the valve.

With reference to the drawings, a preferred embodiment of the present invention is described above, it should be understood that it merely belongs to an example. However, the present invention is not limited to the above example, various changes, improvements or modifications can be made without departing from the scope of the spirit of the present invention. The protection scope of the present invention is defined by the attached claims.

What is claimed is:

1. A sealed type motor arrangement, comprising: a micro-motor with a reduction unit and a sealed housing made of plastic, said sealed housing having a bottom housing and a cover housing, said sealed housing defines a sealed space for accommodating said micro-motor and a non-sealed space, in the periphery of said sealed space of said bottom housing, said sealed housing space having a small groove with a resilient sealing plastic washer arranged therein, said bottom housing having an opening for a cylindrical shaft of said micro-motor to extend out of said sealed housing, a plurality of small apertures are arranged symmetrically between said bottom housing and said cover housing for tightening a plurality of screws to make said bottom housing and said covered housing sealed, a wire with a power supply input plug goes through an opening on a side wall of said bottom housing and a hole on a wall between said sealed space and said non-sealed space to connect a pair of leads of said motor in said sealed space, the hole on said wall through which the wire goes is sealed by a sealing clamping-sheet in the space defined by a projection part arranged in the non-sealed space of said bottom housing.

2. The sealed type motor arrangement according to claim 1, further comprising a pair of projections arranged in said non-sealed space of said bottom housing for fixing a power-supply output socket, said socket having a pair of jacks, said jacks of said socket facing an opening of said bottom housing, said wire of said socket through a second hole on said wall to connect with said wire of said plug in said sealed space.

3. The sealed type motor arrangement according to claim 1, further comprising an openable valve being fixed on said opening by a screw and a spring, said openable valve being adapted to cover said opening.

* * * * *